(12) United States Patent
Bakharev

(10) Patent No.: US 8,086,386 B2
(45) Date of Patent: Dec. 27, 2011

(54) HIGH EFFICIENCY INTERNAL COMBUSTION ENGINE

(75) Inventor: Alexander Bakharev, Niskayuna, NY (US)

(73) Assignee: AB Engine Incorporated, Niakayuna, NY (US)

(*) Notice: Subject to any disclaimer, the term of this patent is extended or adjusted under 35 U.S.C. 154(b) by 636 days.

(21) Appl. No.: 12/129,595

(22) Filed: May 29, 2008

(65) Prior Publication Data

US 2008/0300772 A1 Dec. 4, 2008

Related U.S. Application Data

(60) Provisional application No. 60/940,646, filed on May 29, 2007.

(51) Int. Cl.
*G06F 19/00* (2011.01)
*F02D 13/02* (2006.01)
*F02B 75/10* (2006.01)

(52) U.S. Cl. ......... 701/103; 123/316; 123/27 R

(58) Field of Classification Search ......... 123/27 R, 123/27 GE, 295, 305, 316, 406.29, 406.3, 123/406.45, 406.47, 435, 478, 480, 347, 123/348, 90.15–90.18; 701/101–105, 110, 701/111, 114, 115

See application file for complete search history.

(56) References Cited

U.S. PATENT DOCUMENTS

| 1,379,327 A | 5/1921 | Bachle |
| 1,397,482 A | 11/1921 | Bachle |
| 1,574,130 A | 2/1926 | Smith |
| 2,292,233 A * | 8/1942 | Lysholm ............ 123/316 |

(Continued)

FOREIGN PATENT DOCUMENTS

EP  0 884 550 A2  12/1998

(Continued)

OTHER PUBLICATIONS

International Search Report and Written Opinion for Corresponding PCT International Application No. PCT/US2008/065161 dated Aug. 28, 2008.

*Primary Examiner* — Willis Wolfe, Jr.
(74) *Attorney, Agent, or Firm* — Heslin Rothenberg Farley & Mesiti P.C.; Victor A. Cardona, Esq.

(57) ABSTRACT

A method for use in generating power in an internal combustion engine from combustion of a fuel admixed with an oxidizing gas and operating cyclically with intentional ignition of a first fuel or with self-ignition of a second fuel which includes changing a volume of a combustion chamber from a fixed minimum volume to a fixed maximum volume wherein the maximum volume is greater than a critical volume. The critical volume includes a volume of the chamber filled with an oxidizing gas at an initial temperature and an initial pressure such that when the temperature is compressed from the critical volume to the minimum volume the gas reaches a maximum temperature and a maximum pressure causing detonation of a first fuel, or the gas exceeds a maximum temperature and a maximum pressure predetermined for self-ignition of a second fuel. A flow of the gas is controlled into the chamber so as to provide an upper limit on the amount of the gas which fills the chamber in each chamber-filling intake part of an engine cycle. The upper limit includes a mass less than an amount of a mass of the oxidizing mass in the critical volume.

18 Claims, 12 Drawing Sheets

U.S. PATENT DOCUMENTS

| | | | |
|---|---|---|---|
| 2,344,993 A | | 3/1944 | Lysholm |
| 2,773,490 A | * | 12/1956 | Miller .................. 123/316 |
| 2,991,616 A | | 7/1961 | Miller |
| 3,416,502 A | | 12/1968 | Weiss |
| 3,714,932 A | * | 2/1973 | Meacham et al. ........ 123/316 |
| 3,938,483 A | | 2/1976 | Firey |
| 3,986,351 A | | 10/1976 | Woods et al. |
| 3,995,606 A | | 12/1976 | Firey |
| 4,128,085 A | | 12/1978 | Kunii |
| 4,174,683 A | | 11/1979 | Vivian |
| 4,354,459 A | | 10/1982 | Maxey |
| 4,426,985 A | | 1/1984 | Kanesaka |
| 4,494,506 A | | 1/1985 | Hayama et al. |
| 4,506,634 A | | 3/1985 | Kerrebrock |
| 4,592,318 A | * | 6/1986 | Pouring .................. 123/295 |
| 4,667,636 A | | 5/1987 | Oishi et al. |
| 4,805,571 A | * | 2/1989 | Humphrey ............... 123/316 |
| 4,815,423 A | | 3/1989 | Holmer |
| 4,862,841 A | | 9/1989 | Stevenson |
| 4,928,638 A | | 5/1990 | Overbeck |
| 5,123,397 A | * | 6/1992 | Richeson ................ 123/316 |
| 5,216,985 A | | 6/1993 | Brummer et al. |
| 5,230,315 A | | 7/1993 | Kanesaka |
| 5,233,948 A | | 8/1993 | Boggs et al. |
| 5,474,036 A | | 12/1995 | Hansen et al. |
| 6,237,549 B1 | | 5/2001 | Huff |
| 6,279,550 B1 | | 8/2001 | Bryant |
| 6,672,270 B2 | | 1/2004 | Armer |
| 6,772,585 B2 | * | 8/2004 | Iihoshi et al. ........... 123/295 |
| 7,059,299 B2 | | 6/2006 | Clark |
| 7,222,614 B2 | | 5/2007 | Bryant |
| 2004/0194748 A1 | | 10/2004 | Asai et al. |
| 2006/0075996 A1 | | 4/2006 | Yoshino et al. |

FOREIGN PATENT DOCUMENTS

| | | |
|---|---|---|
| EP | 0 884 550 A3 | 12/1999 |
| JP | 02-061326 A | 1/1984 |

* cited by examiner

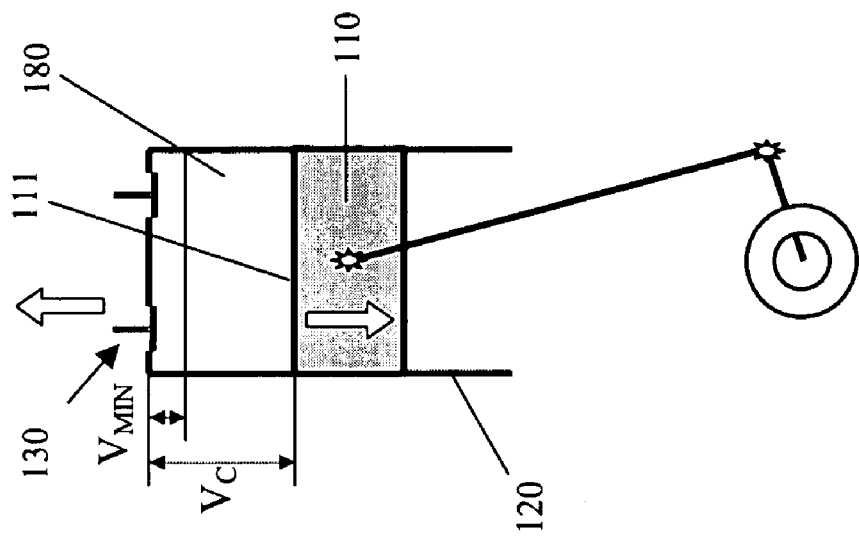
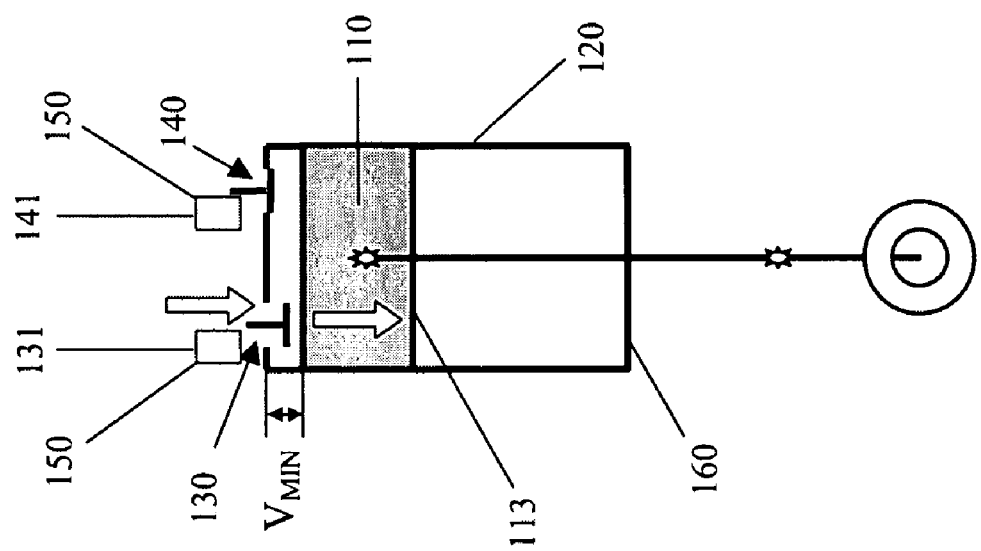
FIG. 4B
FIG. 4A

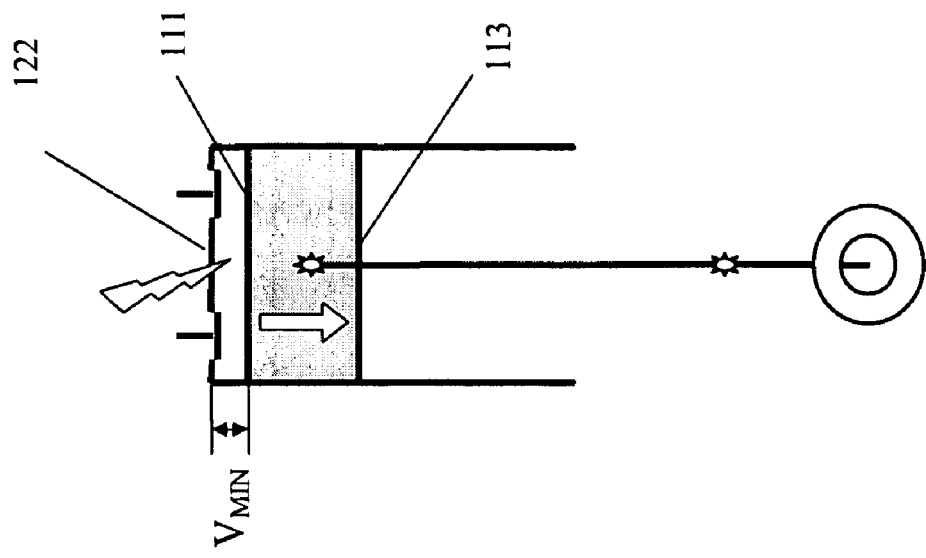
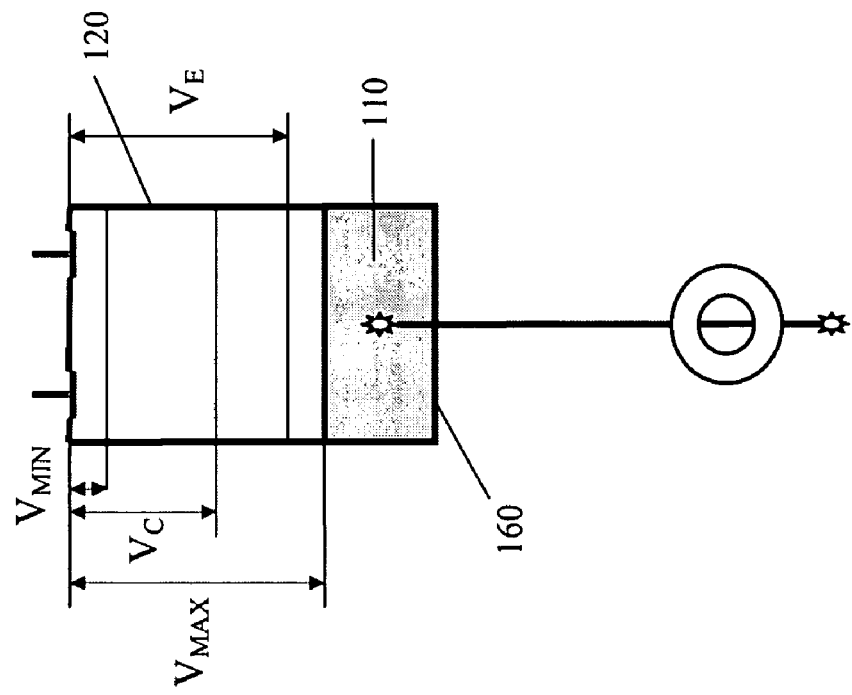
*FIG. 4D*
*FIG. 4C*

HIGH EFFICIENCY INTERNAL COMBUSTION ENGINE

CROSS-REFERENCE TO RELATED APPLICATIONS

This application claims priority from U.S. Provisional Application No. 60/940,646, filed May 29, 2007, the entirety of which is hereby incorporated by reference.

TECHNICAL FIELD

This invention relates, in general, to Internal Combustion Engines, and in particular, to systems and methods for generating and using power via Internal Combustion Engines.

BACKGROUND ART

An Internal Combustion Engine (ICE) is a cyclic device in which the thermal energy of burned fuel is partially converted into mechanical energy. The fundamental upper limit for efficiency of such a conversion is set by the efficiency of the reversible Carnot cycle operating between the same limiting hot ($T_H$) and cold ($T_C$) temperatures as the real engine, $\eta = 1 - T_H/T_C$ (as is well-known, this statement represents one of the equivalent formulations of the Second Law of Thermodynamics). For example, an engine operating between the combustion temperature of gasoline ($T_H$=2,300 K) and room temperature ($T_C$=300 K), the Carnot efficiency $\eta$ is 87%. Conventional ICEs such as Otto cycle engines have efficiencies at best approaching 40-50% using low octane rated fuels available for consumers. Various attempts have been made to improve the efficiency of internal combustion engines but much room for increased efficiency remains.

As is well-known, gasoline-fueled ICE operation can be described as an idealized, cyclic process called the Otto cycle. The Otto cycle is depicted in FIG. 1A in terms of its different stages (strokes), in FIG. 1B on a thermodynamic pressure-volume diagram, and in FIG. 2A as a pressure vs. cycle phase diagram.

The Otto cycle stages include:

1) Intake stroke: taking in an amount of gas (air mixed with fuel); during this stroke the volume of a cylinder increases by a factor which is called a compression ratio r; for present-day automobile ICE, r is equal to about 9-10.5.

2) Compression stroke: quickly compressing the mixture to a considerably higher pressure while raising its temperature. This compression takes place almost without heat exchange with the cylinder walls, i.e. near-adiabatically, but at the same time in an almost-reversible way; in an idealized Otto cycle this is represented by an adiabatic lower curve on a PV diagram in FIG. 1B. The maximum pressure at point b in FIG. 1B to which the mixture can be compressed is limited by the condition that it does not self-ignite (the undesirable phenomenon of self-ignition is also called detonation or dieseling), 3) Ignition: intentionally igniting (e.g., via a spark plug) the compressed mixture at point b in FIG. 1A, creating a nearly instantaneous increase in pressure at a fixed volume (i.e., an isochoric process b-c in FIG. 1B, followed by 4) Power stroke: a near-adiabatic and almost-reversible expansion of combustion products by a volume factor r, accompanied by the partial transfer of thermal energy of the burned mixture into mechanical energy; the transfer being achieved via setting in motion, by the gas pressure, an appropriate mechanical element such as a moving piston, as shown in FIG. 1A (e.g., or a rotor in a rotary ICE).

5) Exhaust stroke: The moving element (e.g. a piston) pushes out the used burned mixture through the open exhaust valve while lowering the pressure back to atmospheric level (another isochoric process d-a in FIG. 1B)

Thus, there is a need for systems and methods which more efficiently convert the internal thermal energy of expanding burned fuel mixture in an internal combustion engine into mechanical energy.

SUMMARY OF THE INVENTION

The present invention provides, in a first aspect, a method for use in generating power in an internal combustion engine which includes controlling a flow of a gas having an initial temperature and an initial pressure to a combustion chamber of the engine by a controller through an intake mechanism to provide a first mass of the gas to the chamber. The combustion chamber is expanded from a minimum volume to a maximum volume in an intake stroke. The maximum volume of the chamber exceeds a maximum compression volume of the chamber. The first mass of the gas in the chamber has a first pressure and a first temperature at the maximum compression volume. The chamber is reduced to the compression volume from the maximum volume in a compression stroke. The compression volume is about a volume of the chamber such that the first mass of the gas at the first pressure and the first temperature in the chamber is less than a maximum mass detonating with a fuel by the end of the compression stroke. The expansion of the chamber from the compression volume to the maximum volume during the intake stroke and the compression of the chamber to the compression volume during the compression stroke includes a process which is about adiabatic and about reversible. The gas has a second pressure and a second temperature during the process which are lower than the initial temperature and the initial pressure. A mixture of the gas and the fuel in the chamber is ignited to expand the chamber from the minimum volume to the maximum volume in a power stroke. The chamber is reduced to the minimum volume from the maximum volume in an exhaust stroke and exhaust gas and burned fuel are exhausted resulting from the igniting into a surrounding ambient environment. The chamber is expanded from the minimum volume to the maximum volume in a next intake stroke and the flow of the gas is controlled to provide the first mass of the gas to the chamber during the next intake stroke.

The present invention provides, in a second aspect, a method for use in generating power in an internal combustion engine which includes controlling a flow of a gas having an initial temperature and an initial pressure to a combustion chamber of the engine by a controller through an intake mechanism to provide a first mass of the gas to the chamber. The combustion chamber is expanded from a minimum volume to a maximum volume in an intake stroke. The maximum volume of the chamber exceeds a maximum compression volume of the chamber. The first mass of the gas in the chamber has a first pressure and a first temperature at the maximum compression volume. The chamber is reduced to the compression volume from the maximum volume in a compression stroke. The compression volume is about a volume of the chamber such that the first mass of the gas at the first pressure and the first temperature in the chamber is more than a minimum mass self-igniting with a fuel by the end of the compression stroke. The expansion of the chamber from the compression volume to the maximum volume during the intake stroke and the compression of the chamber to the compression volume during the compression stroke includes a process which is about adiabatic and about reversible. The gas has a second pressure and a second temperature during the process which are lower than the initial temperature and the initial pressure. The mixture of the gas and the fuel in the chamber is self-ignited to expand the chamber from the minimum volume to the maximum volume in a power stroke. The chamber is reduced to the minimum volume from the maximum volume in an exhaust stroke and exhaust gas and burned fuel are exhausted resulting from the igniting into a surrounding ambient environment. The chamber is expanded from the minimum volume to the maximum volume in a next intake stroke and the flow of the gas is controlled to provide the first mass of the gas to the chamber during the next intake stroke.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

FIG. 4A is a side cross-sectional block diagram view of a piston in a top-centered position in a cylinder in accordance with the present invention;

FIG. 4B is a side cross-sectional block diagram view of the piston of FIG. 4A in an expansion stroke moving away from the top of the cylinder and located at compression volume of combustion chamber;

FIG. 4C is a side cross-sectional block diagram view of piston of FIG. 4A in a bottommost position in the cylinder;

FIG. 4D is a side cross-sectional block diagram view of the piston in the cylinder of FIG. 4A compressed and at the point of ignition of fuel in the cylinder;

DETAILED DESCRIPTION

In accordance with the principles of the present invention, an internal combustion engine system and methods for generating power using an internal combustion engine are provided.

Figure 1A:
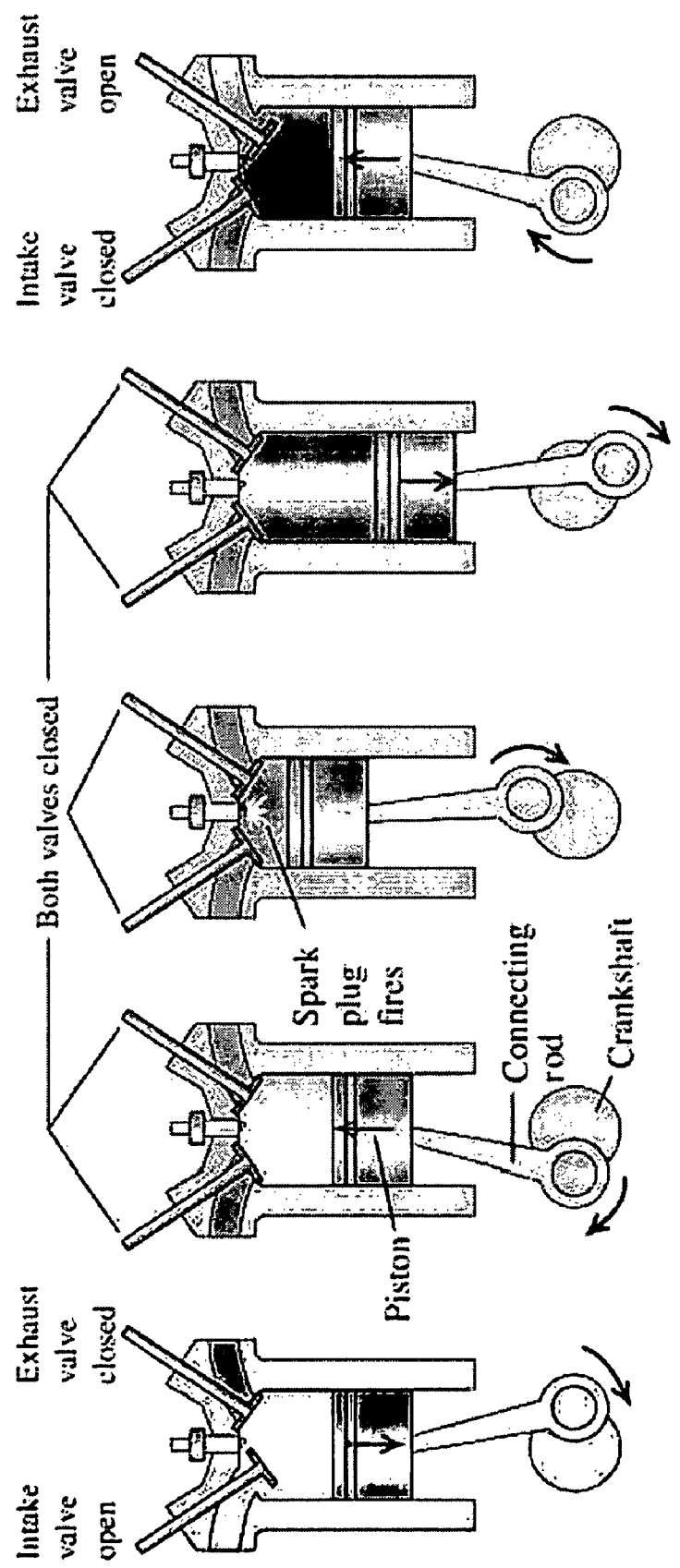
FIG. 1A depicts a cycle of an internal combustion engine.
Figure 1B:
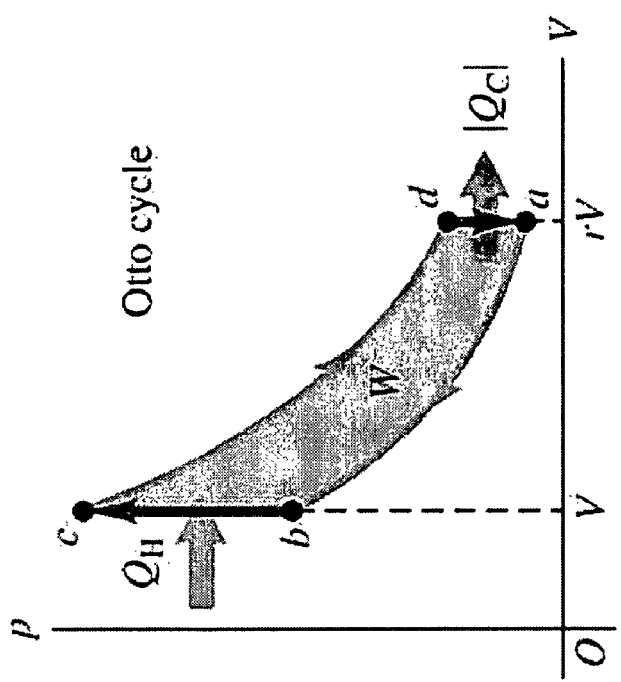
FIG. 1B is a pressure versus volume diagram of an Otto cycle of an internal combustion engine.
Figure 3:
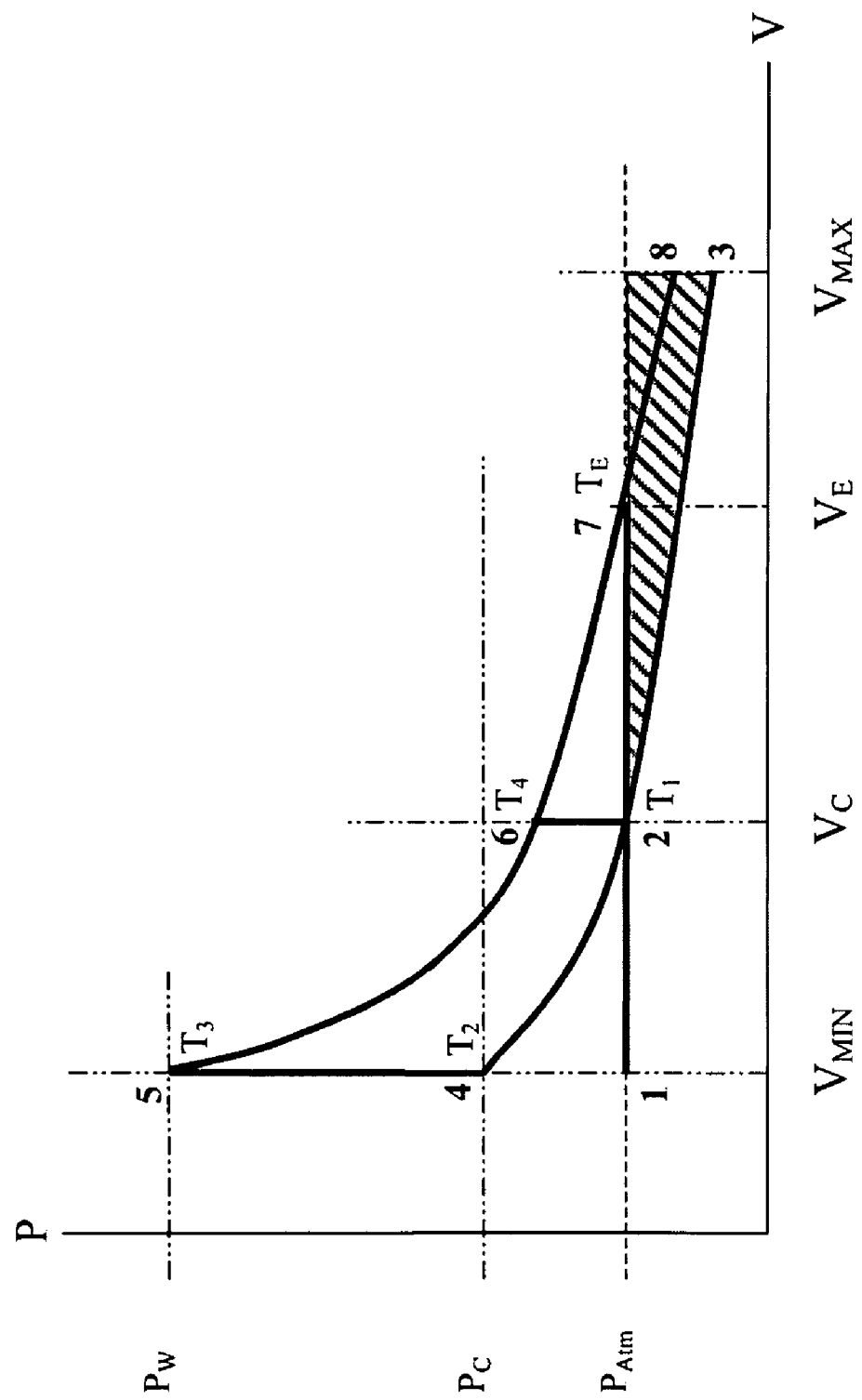
FIG. 3 is a pressure versus volume diagram of a cycle of an internal combustion engine in accordance with the present invention.

FIG. 3 depicts the conventional Otto cycle (2-4-5-6) in pressure-volume coordinates as also shown above in FIG. 1B, and further depicts a cycle extension (6-7-8-3-2) for a proposed engine and method for generating power in accordance with the present invention. The cycle depicted is different from the conventional Otto cycle and includes the following steps:

1-2: Fuel mixture intake at atmospheric pressure
2-3: Adiabatic expansion of mixture to below atmospheric pressure
3-2: Adiabatic compression back to atmospheric pressure
2-4: Adiabatic compression to the same pressure as in conventional Otto cycle
4-5: Burning fuel mixture as in conventional Otto cycle
5-6-7-8: Adiabatic expansion of gas to the pressure which is always lower than in Otto cycle (can be even below the atmospheric pressure)
8-7: Adiabatic expansion to the atmospheric pressure
7-2-1: Exhaust of gas at atmospheric pressure In FIG. 3, $V_{MIN}$ indicates a volume of an engine cylinder at maximum compression for both a conventional prior art engine cycle and the engine cycle of the present invention, $V_C$ and $V_{MAX}$ indicate volumes at maximum expansion, respectively for conventional and proposed engine cycles. All thermo-dynamical parameters (volumes, temperatures and pressures) on trace 2-4-5-6 are exactly the same for both conventional and proposed engines. The only difference is an extra area outlined by 2-6-7-2, which is responsible for additional useful work performed by expanding gas in the present invention. Since the work required to compress the fuel mixture (area outlined by 1-2-4-1) is the same for both engines, this will result in increased efficiency of the proposed engine. Thus, an increase of efficiency in the proposed engine is based on the fact that an expansion ratio exceeds a compression ratio, thus using more energy from the power stroke for performing useful work during an engine cycle.

As depicted in FIG. 3, to achieve the described gain in efficiency, a working volume of an engine cylinder is increased from $V_C$ to $V_{MAX}$. However, it can be easily shown that the same increase in efficiency can be achieved by a proportional decrease of volume $V_{MIN}$ instead. So it is convenient to consider volumes in FIG. 3 to represent values referred to the volume of maximum compression $V_{MIN}$. Alternatively, the V axis in FIG. 3 could be graduated in values of compression ratio $r=V/V_{MIN}$. In this case, the conventional Otto engine has equal compression and expansion ratios of $V_C/V_{MIN}$, while the proposed engine has a compression ratio of $V_C/V_{MIN}$ and an expansion ratio $V_E/V_{MIN}$. It is exactly this difference in compression and expansion ratios which makes the efficiency of the proposed engine higher.

Figure 4F:
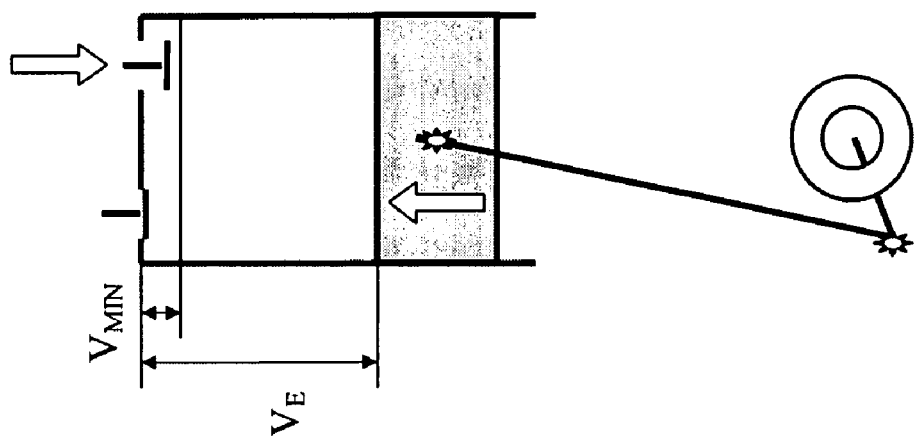
FIG. 4F is a side cross-sectional block diagram view of the cylinder of FIG. 4A during an exhaust stroke at the point of effective volume.

An example of a cycle of a reciprocating piston 110 in a cylinder 120 of an engine (not shown) of the present invention as described above is depicted in FIGS. 4A-F. An intake valve 130 and an exhaust valve 140 may be controlled by a controller 150 (e.g., a computing unit or other electronic or mechanical computing device) driving actuators 131 and 141 to control openings and closings of valve 130 and valve 140, respectively. FIG. 4A depicts a beginning of an intake stroke with an air-fuel mixture starting to fill cylinder 120 from volume $V_{MIN}$ up through intake valve 130 which is open at a full extension of piston 110 toward a top 122 of cylinder 120.

While the piston is moving down (i.e., toward a bottom 160 of cylinder 120) the cylinder is filled to a volume $V_{MAX}$. No work is done during the process because the mixture is at atmospheric pressure and a constant ambient temperature $T_1$.

When piston reaches volume $V_C$, intake valve 130 closes as depicted in FIG. 4B. The filling process of the air-fuel mixture through intake valve 130 corresponds to trace 1-2 depicted in FIG. 2A-B as described above. After the intake valve closes, a reserve stroke continues to bottom 160 as depicted in FIG. 4C and which corresponds to trace 2-3 in FIG. 3. The mixture expands approximately adiabatically during the reserve stroke to volume $V_{MAX}$ as depicted in FIG. 4C. In a return stroke, piston 110 returns to compression distance 170 and the mixture is compressed back to volume $V_C$ corresponding to trace 3-2 in FIG. 2.

As indicated, intake valve 130 closes and piston 110 extends through the reserve stroke and the return stroke such that the volume is the same before and after the combined reserve stroke and a return stroke. During the reserve stroke, a pressure in a chamber or interior 180 of cylinder 120 drops until the piston reaches bottom 160 of the cylinder and increases during the return stroke as the piston returns to compression volume $V_C$. Thus, a pressure of the air-fuel mixture in interior 180 is lower during the reserve stroke and the return stroke than when a top 111 of piston 110 is between the compression distance and top 122 of cylinder 120.

Also, the reserve stroke and return stroke occur substantially adiabatically. Thus, the thermodynamic state of the mixture will be substantially the same after the piston returns to compression distance $V_C$ after the reserve and return strokes as just before starting the expansion from $V_C$ to $V_{MAX}$ (i.e., the extension of the piston from the compression distance to the bottom of the cylinder) in the reserve stroke.

Further, a difference in pressure above and below piston 110 during the reserve and return strokes does the work required for moving the cylinder during the reserve and return strokes, which can be either positive or negative, depending on particular pressures. More specifically, the work done on trace 3-2 depicted in FIG. 3 will have a same magnitude but the opposite sign compared to the work on trace 2-3, so the total work done on trace 2-3-2 (i.e. the extension of the piston from the compression distance to the bottom of the cylinder and back to the compression distance) will be equal to zero.

A compression stroke continues from compression volume $V_C$ to volume $V_{MIN}$ as depicted in FIG. 4D. For example, a pressure of the mixture in interior 180 may reach a value equivalent to a conventional engine at $V_{MIN}$. The reserve stroke may be considered to be a portion of an entire intake stroke while the return stroke may be considered to be a portion of an entire compression stroke.

The mixture is then ignited (e.g., using a spark plug) and burned at the top of the compression stroke, which may cause the pressure and temperature in interior 180 to rise to values $P_W$ and $T_3$ which may be the same as in a conventional engine, as depicted at point 4 in FIG. 3. In another example, such a mixture would self-ignite if diesel fuel and no spark plug were used, along with the appropriate pressure for self-ignition of the mixture.

Figure 4E:
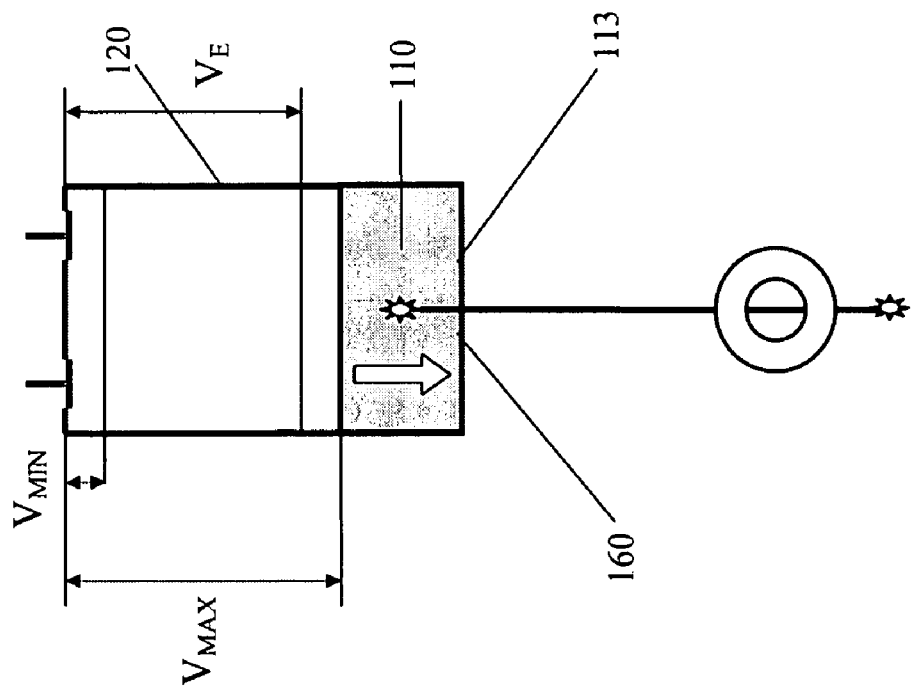
FIG. 4E is a side cross-sectional block diagram view of the cylinder of FIG. 4A after a power stroke in response to the ignition depicted in FIG. 4D.

The burned mixture in the interior of the cylinder expands to $V_{MAX}$ during a power stroke depicted in FIG. 4E. For example, interior 180 may expand from $V_{MIN}$ to $V_E$ shown by trace 5-6-7 in FIG. 3. An interior pressure in interior 180 at $V_E$ may be the ambient pressure of the environment around cylinder 120 and any engine of which it is a part. The work contribution to the total cycle work assuming expansion to $V_E$ is positive and is determined by formulae described below involving volume change from $V_{MIN}$ to $V_E$. Piston 110 may further extend such that interior 180 reaches $V_{MAX}$ as depicted in FIG. 4E and FIG. 3 with a bottom 113 of piston 110 extending substantially to bottom 160.

$V_{MAX}$ may be a volume of interior 180 at the greatest extent of piston 110 relative to top 122. For example, $V_{MAX}$ may be greater than $V_E$ as depicted in FIG. 4E. When $V_{MAX} \leq V_E$, the pressure in interior 180 drops to a pressure value above the ambient atmospheric pressure, and the power stroke concludes at volume $V_{MAX} < V_E$.

In an example where $V_{MAX}$ is greater than a volume (i.e, $V_E$) at which a pressure of interior 180 would be equal to a pressure of the surrounding ambient environment (as depicted in FIG. 4E, the pressure of the interior drops below $V_E$ at an end portion of the power stroke (i.e., from $V_{MIN}$ to $V_{MAX}$). Specifically, the gas expands to below the atmospheric pressure, i.e., to $V_{MAX} > V_E$ as shown by trace 7-8 in FIG. 3. The work done during the expansion from $V_E$ to $V_{MAX}$ is negative.

After the power stroke depicted in FIG. 4E, piston 110 moves up in a beginning of an exhaust stroke depicted in FIG. 4F with the valves (i.e., valve 130 and valve 140) closed until the volume in interior 180 reaches $V_E$ again at point 7 in FIG. 3. A substantially adiabatic process between $V_E$ on the power stroke and $V_E$ on the exhaust stroke is indicated by trace 7-8-7 in FIG. 3. Due to the reversibility of this adiabatic process, the gas (i.e., air-fuel mixture) comes to the same state (e.g., a pressure and temperature state) at point 7 as in the same point during the power stroke expansion. Similar to trace 2-3-2 described above, the total work in trace 7-8-7 is equal to zero, resulting from such substantial adiabatic reversibility.

Upon reaching volume $V_E$ at point 7 in FIG. 3, exhaust valve 140 depicted in FIG. 4F opens and the burned mixture flows out exhaust valve 140 at atmospheric pressure without performing any work. Such exhaust process extends until the volume $V_{MIN}$ and is shown by trace 7-2-1 in FIG. 3. The exhaust through value 140 at atmospheric pressure facilitates the flow of the exhaust from interior 180 of the cylinder to the surrounding ambient environment.

A total work during the whole cycle depicted in FIGS. 3 and 4A-F is calculated as a sum of works done on traces 2-3, 3-2, 2-4, 5-7, 7-8, 8-7, which is represented by corresponding terms in the following expression:

$$W_B = W_1 - W_1 - W_2 + W_3 + W_4 - W_4 = W_3 - W_2$$

where:
$W_1$ and $-W_1$ is the work during the reserve (i.e., from $V_C$ to $V_{MAX}$) and return strokes (i.e., from $V_{MAX}$ to $V_C$)
$W_2$ is the work done during compression of mixture from $V_C$ to $V_{MIN}$
$W_3$ is the work done during expansion of combustion gas from $V_{MIN}$ to $V_E$
$W_4$ and $-W_4$ is the work during the expansion from $V_E$ to $V_{MAX}$ and contraction from $V_{MAX}$ to $V_E$.

This work $W_B$ is represented in FIG. 3 by the area outlined by 2-4-5-7-2 and is greater than similar work $W_S$ done by a standard conventional engine, which is equal to the area outlined by 2-4-5-6-2. Thus, the effectiveness of the engine of the present invention exceeds that of a standard engine by a factor:

$$E_{BS} = W_B / W_S$$

In contrast to the conventional Otto cycle, an intake stroke in the engine of the present invention consists of two parts represented by traces 1-2 and 2-3 in FIG. 3. Trace 1-2 corresponds to filling the cylinder with an air-fuel mixture at atmospheric pressure, which ideally requires no work, the same as in a conventional engine. At point 2, the intake valve (e.g., intake valve 130) closes, resulting in an injection of exactly a substantially same amount of fuel mixture as would be injected in a conventional engine. Point 2 depicted in FIG. 3 is a point (e.g., compression volume $V_C$) at which a compression of the fuel air mixture (i.e, from $V_C$ to $V_{MIN}$) would yield a same conventional compression ratio maximized for a given fuel type (i.e., while avoiding detonation). However, in the engine depicted in FIGS. 4A-F, the expansion continues substantially adiabatically to working volume $V_{MAX}$ (via the reserve stroke described above) in accordance with the adiabatic equation:

$$PV^\gamma = Const = K$$
$$\text{where } \gamma = \frac{C_P}{C_V}$$

where $C_P$ and $C_V$ are constant pressure and constant volume heat capacities of the gas mixture (mainly air).

The work in the adiabatic process can be calculated as $$W = \int_{V_i}^{V_f} P\, dV$$

so that $$W = K\int_{V_i}^{V_f} \frac{dV}{V^\gamma} \text{ or}$$
$$W = \frac{K(V_f^{1-\gamma} - V_i^{1-\gamma})}{1-\gamma}$$

As described above, the compression stroke includes two parts represented by trace 3-2 (also described as a return stroke) and trace 2-4, which are also substantially adiabatic. Taking into consideration the (approximate) reversibility of adiabatic processes as implemented in ICE, the work done depends only on initial and final pressures and volumes. Thus, the total work done in trace 2-3-2 is substantially equal to zero. As a result at the end of trace 3-2, the fuel mixture comes to substantially the same state as in the beginning of the compression stroke of the conventional engine.

Thus, it is always possible at any given constructional compression ratio (i.e, $V_{MAX}/V_{MIN}$) to fill a cylinder (e.g., cylinder 120) with an amount of a fuel-air mixture necessary for optimal operation (i.e., the maximum amount which still avoids detonation) for a conventional engine with compression ratio $V_C/V_{MIN}$.

For example, for a given amount of fuel mixture, if it is considered to be an ideal gas, all equilibrium processes, including the adiabatic process obeys the ideal gas equation:

$$\frac{P_{atm}V_c}{T_1} = \frac{P_C V_{MIN}}{T_2}$$

where $P_{atm}$, $T_1$ are pressure and temperature at the beginning of the compression (point 2 in FIG. 3) and $P_C$, $T_2$ are pressure and temperature at the end of the compression (point 4 in FIG. 3).

After compression to volume $V_{MIN}$, the state (e.g., temperature and pressure in an interior of the cylinder) of the mixture will be the same regardless of when or how during the intake stroke the mixture has filled the cylinder. Consequently, it is not necessary to fill the cylinder along the trace 1-2-3-2 in FIG. 2. It is possible to fill the cylinder slower, or intermittently, or even during the process 3-2. It is only important to achieve the same state (e.g., temperature and pressure) of the mixture at the end of the process 3-2. Therefore, the work required for compression of the fuel mixture depends only on initial and final thermo-dynamical states of the mixture and will not depend on a particular time of filling of the cylinder.

The power stroke is a standard adiabatic expansion shown by the trace 5-6-7-8 in FIG. 3. The work released depends only on the final and initial volumes and is given by:

$$W = \frac{K(V_f^{1-\gamma} - V_i^{1-\gamma})}{1-\gamma}$$

In contrast to the work required for compression of a mixture, which is the same for the cylinder described above relative to FIGS. 3 and 4A-F as in a conventional engine, the work during the power stroke (i.e., from $V_{MIN}$ to $V_{MAX}$ in FIGS. 4D-E and trace 5-6-7-8) exceeds the work done for a conventional engine. As depicted in FIG. 3, the area outlined by the trace 2-4-5-6-2 represents the useful work done in the conventional Otto cycle. The area outlined by 2-6-7-2 is an additional work done by the proposed engine described and depicted herein, with the additional work resulting in increased efficiency relative to a conventional Otto engine.

As is evident from FIG. 3, the extra area (i.e., the area outlined by 2-6-7-2) results from $V_{MAX}$ being always greater than $V_C$ in the engine described and depicted in FIGS. 3 and 4A-F. Thus, a physical compression ratio $V_C/V_{MIN}$ is always less than the constructional compression ratio $V_{MAX}/V_{MIN}$. An ideal value of $V_{MAX}$ would be $V_{MAX}=V_E$, where $V_E$ is the volume at point 7 where pressure drops down to the atmospheric value $P_{atm}$ as described above. $V_E$ provides an advantageous condition for exhaust of the results of the combustion since such exhaust occurs at atmospheric pressure.

However, when $V_{MAX}>V_E$ the expansion during the expansion stroke described above continues to point 8 in FIG. 3 where the pressure $P<P_{atm}$. In another example, the volume of interior 180 may be adjusted to maintain optimal combustion conditions for fuels with different octane ratings. In particular, engine geometry (e.g., a size of the cylinders including maximum and minimum volumes thereof) may be optimized for a fuel with a highest octane rating that is anticipated to be used in the engine such that $V_{MAX}=V_E$ for this given fuel. To avoid detonation in the same engine when using lower octane fuels, $V_C$ is reduced to capture less air-fuel mixture and to decrease a working pressure $P_W$. This causes the pressure at point 8 (FIG. 3) to drop below the atmospheric level at volumes greater than $V_E$. However, since both the expansion 7-8 and the compression 8-7 are approximately reversible adiabatic processes as described above, the total work on the trace 7-8-7 is about zero, and thus does not affect the efficiency of the engine. Instead, the efficiency is automatically maintained at the maximum possible level for any octane rating of the fuel and can be calculated as if the gas always expands to an effective volume $V_E$. Thus, a volume ($V_C$) of the cylinder and therefore a compression distance for a compression stroke may be adjusted based on the octane level of a fuel to be used. For example, a user may indicate to a controller the fuel which is being used, or a sensor may determine such fuel, such that an intake valve may be opened and closed by an actuator controlled by the controller to allow a fuel—air mixture along with a compression distance to be adjusted based on the type of fuel used.

Figures 2A, 2B:
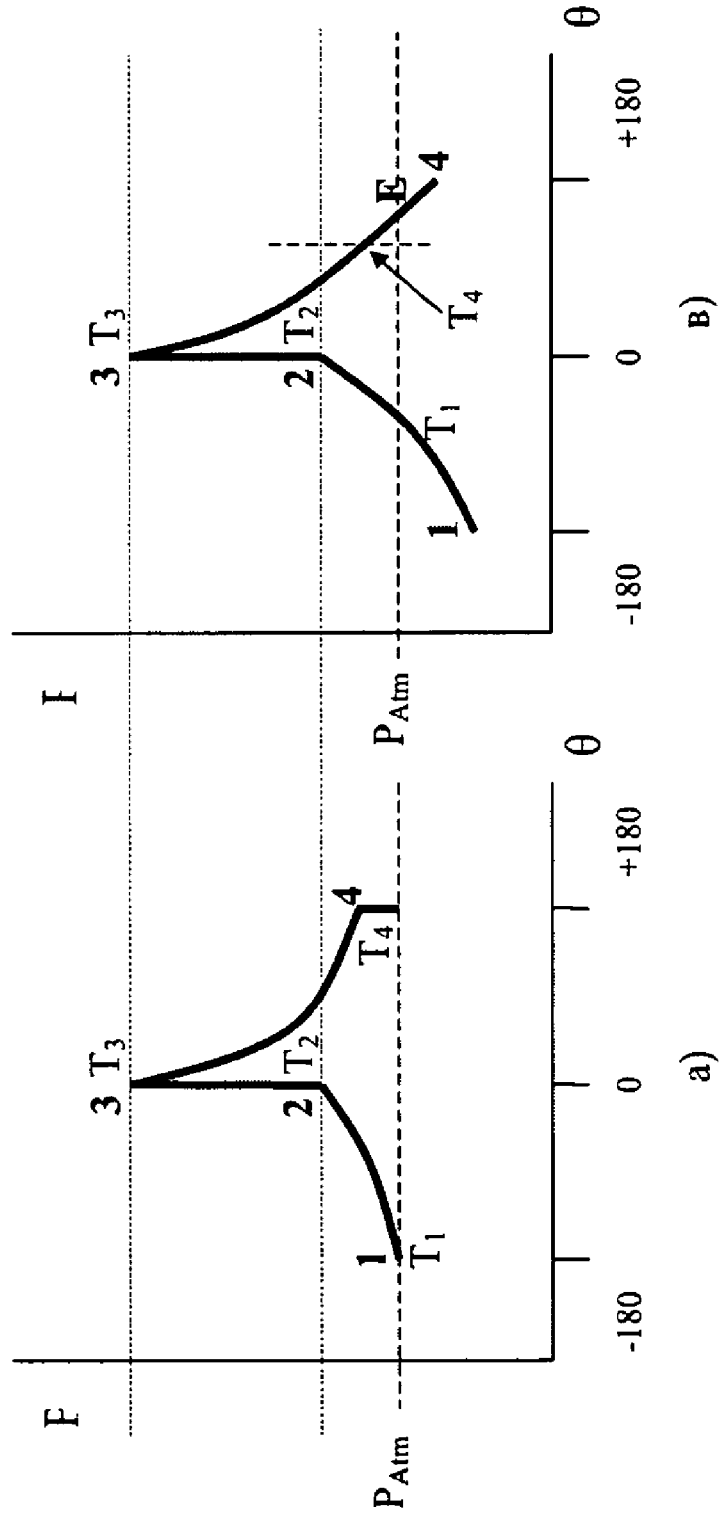
FIG. 2A is a pressure versus phase cycle diagram of an Otto cycle of an internal combustion engine.
FIG. 2B is a pressure versus phase cycle diagram of a cycle of an internal combustion engine in accordance with the present invention.

Turning to FIGS. 2A-2B, in conventional engine design a maximum compression of intake gas and expansion ratios is the same, being equal to the ratio of maximum to minimum cylinder volumes, r. A consequence of this ratio equality is that the temperature changes by the same factor during adiabatic compression and expansion processes. The adiabatic equation relating temperature and volume $TV^{\gamma-1}$=Constant implies this if the volume is changing by the same factor r in both processes, so is the temperature:

$$T_3/T_4 = T_2/T_1$$

where $T_1$, $T_2$, $T_3$, $T_4$ are gas temperatures in points 1, 2, 3, 4 of the Otto cycle shown in FIG. 2A.

Relative to the engine described above relative to FIGS. 3 and 4A-F, FIG. 2B depicts a cycle diagram different than that for a prior art engine depicted in FIG. 2A. Both the intake and exhaust strokes are important for the engine thermodynamics in FIG. 2B. Both the conventional Otto cycle (FIG. 2A) and the proposed cycle (FIG. 2B) of the present invention are shown for a maximum filling of cylinders with the air-fuel mixture. The cycle in FIG. 2B always realizes the same temperatures and pressures at points 2 and 3 as in conventional Otto cycle depicted in FIG. 2A. However, the temperatures and pressures at points 1 and 4 are always lower in the engine described herein relative to the conventional Otto cycle of FIG. 2A. Moreover, the temperature and pressure at point 4 may also go even lower than atmospheric values. FIG. 3 also depicts same conventional Otto cycle (i.e., trace 1-2-4-5-6-2) of FIG. 2A along with a cycle extension (i.e., trace 6-7-8-3-2) for the engine described herein as described above.

Using the notations of FIGS. 2A-2B for a conventional Otto cycle, the efficiency q of an engine can be expressed as follows:

$$\eta = \frac{W_{net}}{g_{in}} = 1 - \frac{g_{out}}{g_{in}} = 1 - \frac{T_4 - T_1}{T_3 - T_2} \tag{1}$$

The fact that compression and expansion ratios are equal in a conventional engine leads to the following relation:

$$\frac{T_3}{T_4} = \frac{T_2}{T_1} = \left(\frac{V_C}{V_{MIN}}\right)^{k-1} = r^{k-1} \tag{2}$$

where r is a compression ratio for the conventional Otto cycle, and k is an effective value of $\gamma$ from formula (3) which is equal to 1.35 for typical air-fuel mixture.

From (2) it follows that:

$$T_3 = T_4 r^{k-1} \tag{3}$$

$$T_2 = T_1 r^{k-1} \tag{4}$$

$$T_3 - T_2 = (T_4 - T_1) r^{k-1} \tag{5}$$

From (1) and (5) we have:

$$\eta = 1 - \frac{1}{r^{k-1}} \tag{6}$$

Figure 6:
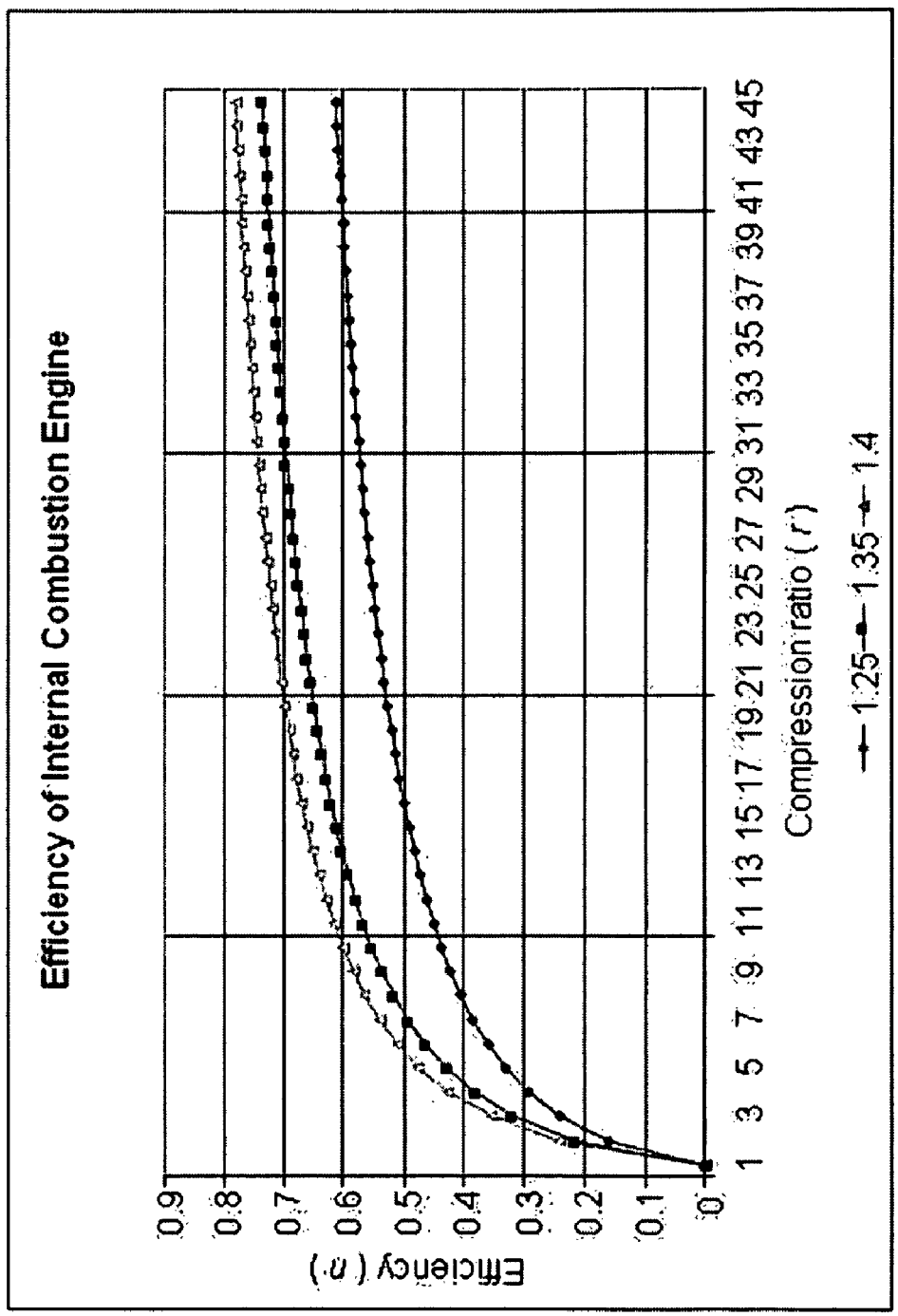
FIG. 6 is a diagram depicting the efficiency of the engine depicted in FIGS. 1A-B and 2A of an Otto cycle engine.

FIG. 6 depicts a classical derivation based on the proportional relation between a change in internal energy and a change in temperature and can be found in numerous classical textbooks as well as in recent publications, e.g., the derivation depicted was taken from the following reference: http://www.engr.colostate.edu/~allan/thermo/page5/page5.html For the purpose of efficiency calculations in the engine described herein relative to FIGS. 3 and 4A-F, it must be taken into consideration that the compression and expansion ratios are different. According to FIG. 3, the gas is compressed above atmospheric pressure from volume $V_C$ to $V_{MIN}$ (i.e., trace 2-4), but expands from volume $V_{MIN}$ to effective volume $V_E$ (i.e., trace 5-6-7). To account for this change, the formula (1) must be modified as follows:

$$\eta = 1 - \frac{T_E - T_1}{T_3 - T_2} \tag{7}$$

The relation between the temperatures and volumes during compression gives:

$$\frac{T_2}{T_1} = \left(\frac{V_C}{V_{MIN}}\right)^{k-1} = r_C^{k-1} \tag{8}$$

where $r_C$ is the compression ratio for the proposed engine.

The similar relation for expansion gives:

$$\frac{T_3}{T_E} = \left(\frac{V_E}{V_{MIN}}\right)^{k-1} = r_E^{k-1} \tag{9}$$

where $r_E$ is the expansion ratio for the proposed engine.

Expressing $T_2$ and $T_E$ from (8) and (9) and inserting them into (7) gives the following expression for $\eta$:

$$\eta = 1 - \frac{\frac{T_3}{r_E^{k-1}} - T_1}{T_3 - T_1 \cdot r_C^{k-1}} = 1 - \frac{(T_3/T_1)/r_E^{k-1} - 1}{T_3/T_1 - r_C^{k-1}} \tag{10}$$

Note that $\eta$ now depends on the ratio $T_3/T_1$, which has an approximate value of 8 for most typical gasoline engines. Assuming the compression ratio of the best gasoline engines $r_C \approx 10$ the doubled expansion ratio of the proposed engine, $r_E \approx 20$, the value of $\eta$ can be calculated as:

$$\eta = 1 - \frac{8/r_E^{k-1} - 1}{8 - r_C^{k-1}} \tag{11}$$
$$= 1 - \frac{8/2.85 - 1}{8 - 2.24}$$
$$= 1 - \frac{1.8}{5.76}$$
$$= 1 - 0.31$$
$$= 0.69$$

The same formula (10) can be used to calculate $\eta$ for a conventional engine, which gives:

$$\eta = 1 - \frac{8/2.24 - 1}{8 - 2.24} = 0.55 \tag{12}$$

Note that this value is in a perfect agreement with a classical formula (14):

$$\eta = 1 - \frac{1}{r^{k-1}} = 1 - \frac{1}{10^{0.35}} = 1 - \frac{1}{2.24} = 1 - 0.45 = 0.55 \quad (13)$$

Figure 8:
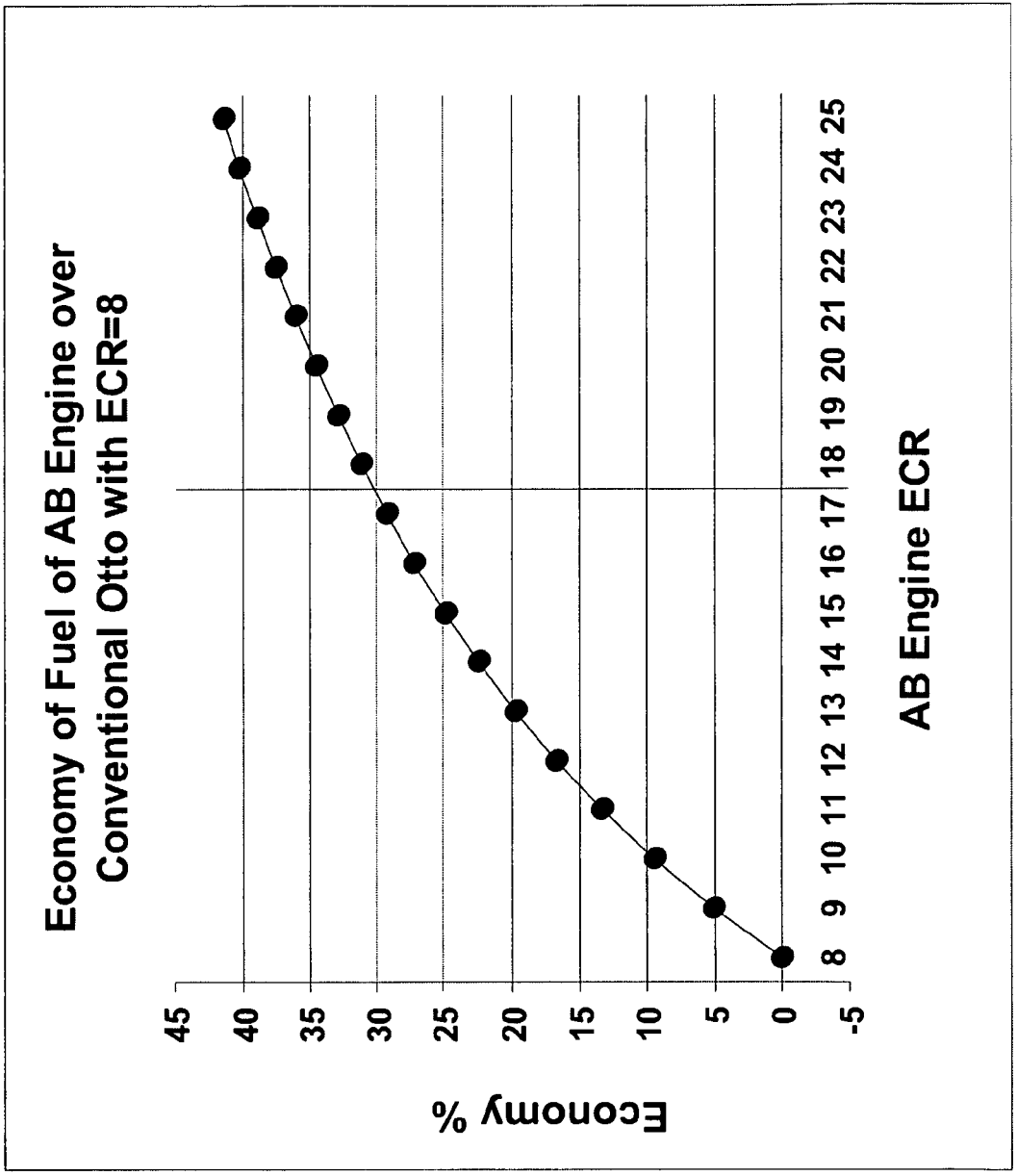
FIG. 8 is a diagram depicting the relative efficiency of the fuel economy of the engine depicted in FIGS. 4A-F relative to a conventional Otto engine.

As will be understood by one skilled in the art, the listed algorithms may be performed on a computing unit or controller and may be stored on computer readable storage mediums which may be read and executed by such a computing unit or controller (e.g., controller 50, controller 235, controller 335). FIG. 8 is a diagram depicting the relative efficiency of the fuel economy of the engine depicted in FIGS. 4A-F relative to a conventional Otto engine with a compression ratio of 8.

Figure 5:
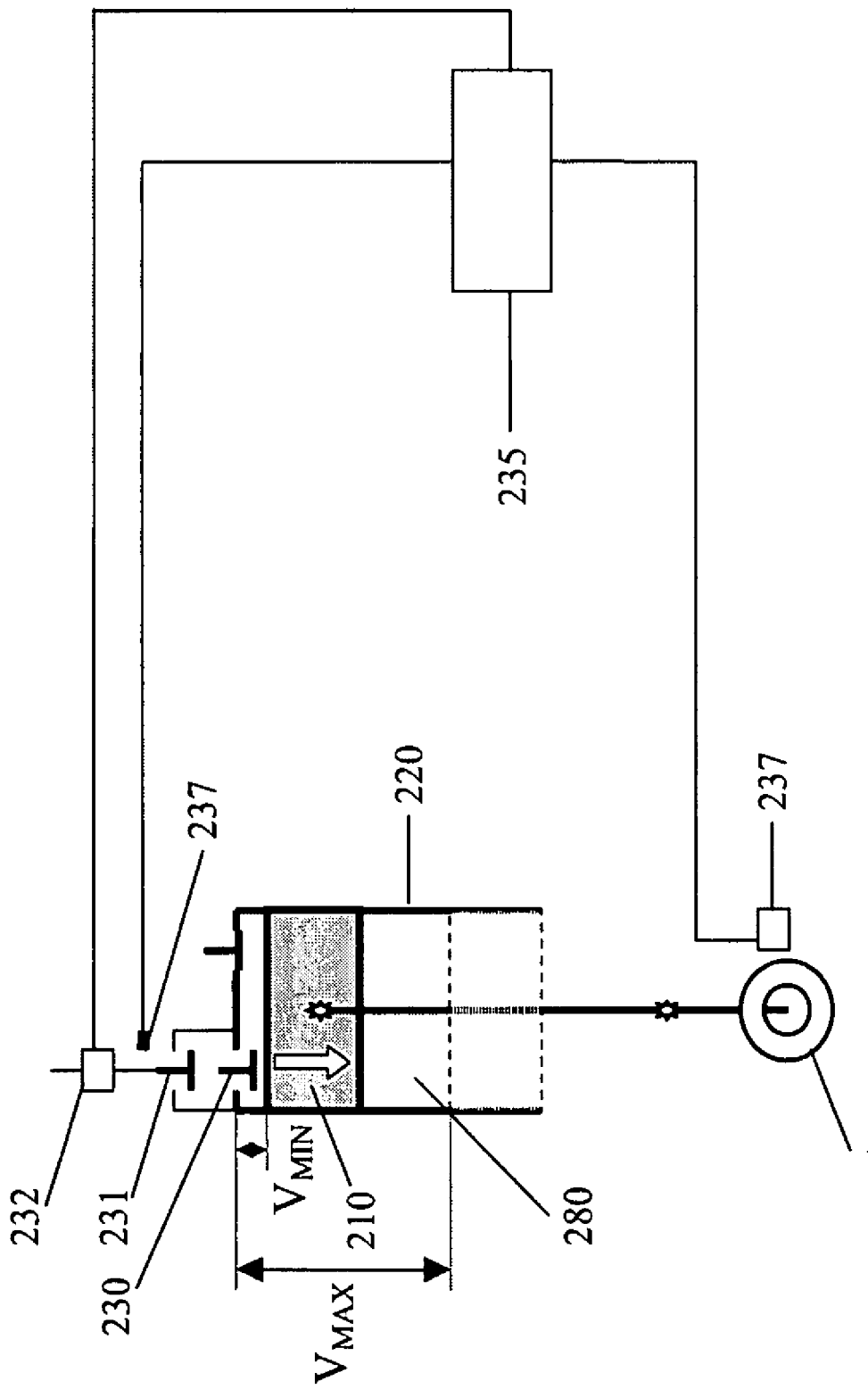
FIG. 5 is a block diagram view of another embodiment of a cylinder and piston portion of an engine in accordance with the present invention.

In another example depicted in FIG. 5, the cylinder and piston described above relative to FIGS. 3 and 4A-F may be modified to include an additional intake mechanism or valve upstream of a standard intake valve. An engine (not shown) including a cylinder 220 and piston 210 is configured with a constructional compression ratio (i.e., $V_{MAX}/V_{MIN}$) exceeding a compression ratio (e.g., up to about 11.5) of a standard gasoline engine, and even exceeding this ratio in a diesel engine (e.g., up to about 25). A main intake valve 230 is a standard mechanical valve as in a conventional engine made of high strength steel to allow the valve to hold high pressure during combustion. As in a conventional engine, intake valve 230 opens in a beginning of an intake stroke of a piston 210 in a cylinder 220 and closes at the end of such a stroke. A second valve 231 is installed just before (i.e., upstream) of valve 230 and is used for adjusting an amount of an incoming gas mixture. Valve 231 opens and closes by means of an actuator 232 controlled by a controller 235 (e.g., a computing unit).

Controller 235 receives data about an angular speed w of a crankshaft 250, a temperature of the air-fuel mixture $T_1$ and/or a crankshaft position which determines a current cylinder volume $V_C$ via one or more sensors 237 configured to determine such parameters. Also, pressure sensors may determine an interior pressure of interior 210 which may be provided to controller 235. Controller 235 also receives or obtains data about parameters of the gas-fuel mixture, including the effective value of k.

Controller 235 determines a time for opening and closing of valve 231, which may be performed according to the following algorithm:

a. First, a maximum possible $V_C$, at which the fuel mixture will burn without detonation, is computed by the formula:

$$V_{C\_max} = \frac{C_F V_{MIN} T_1}{P_1} \quad (14)$$

where $C_F$ is the factor determined by critical pressure $P_C$ and temperature $T_C$, at which the mixture is close to detonation, as follows:

$$C_F = \frac{P_C}{T_C} \quad (15)$$

where $T_C \equiv T_2$. The factor $C_F$ is measured experimentally for each particular engine design and fuel type. The measurements should be carried out at low angular velocity w of the engine, at which the resistance of intake manifold to the mixture flow doesn't depend on w.

b. At higher values of w, $V_{C\_max}$ has to be adjusted upward due to higher resistance to the mixture flow. The behavior of $V_{C\_max}$ as a function of w is measured experimentally for every particular engine design.

c. The actual value of $V_C$ is then computed by the formula:

$$V_C = F \cdot V_{C\_max} \quad (16)$$

where F is the position factor of the accelerator pedal ranging from 0 to 1.

Controller 235 causes actuator 232 to open valve 231 in the beginning of intake stroke and closes it when the volume reaches the computed value $V_C$. Controller 235 may also open and close valve 231 at other moments of time during the intake stroke, based on required engine power. Such opening and closing may be done to avoid a maximum amount of mixture drawn into an interior 280 of cylinder 220 exceeding an amount causing detonation.

Resulting from the use of controller 235 to control second intake valve 231 an optimal value of $C_F$ for the engine operation at maximum power per cycle without detonation may be maintained automatically. The value of $C_F$ may be maintained at a constant level independent of:

a. Temperature variations of the intake fuel mixture
b. Variations in pressure at the intake manifold, and consequently, independent of a change in flow resistance of air filters.
c. Variations in design of the intake manifold, which results in different air flow resistance. The requirement of minimization of the intake manifold resistance, which is vitally important in conventional engines, is also unnecessary.

Further, the engine cycle power may be maintained at a constant level, set by the accelerator pedal, independently of the parameters listed above in paragraphs a-c. The engine may use the fuel (e.g., gasoline, ethanol, organic gases, biodiesel, etc.) of any octane rating including diesel fuel, with almost the same efficiency. A change in octane rating will only cause a change in the cycle power, because any required fuel mixture can be accommodated by small adjustment of $V_C$. More specifically, such adjustment of $V_C$ results in only minor variations in compression ratio $r_C$ and consequently, the efficiency calculated by the formula (10) described above. For diesel fuel engines, the required $V_C$ is almost twice as high as that for gasoline engines and, to avoid a noticeable drop in power, the constructional compression ratio (i.e, $V_{MAX}/V_{MIN}$) must be correspondingly increased.

Figure 7:
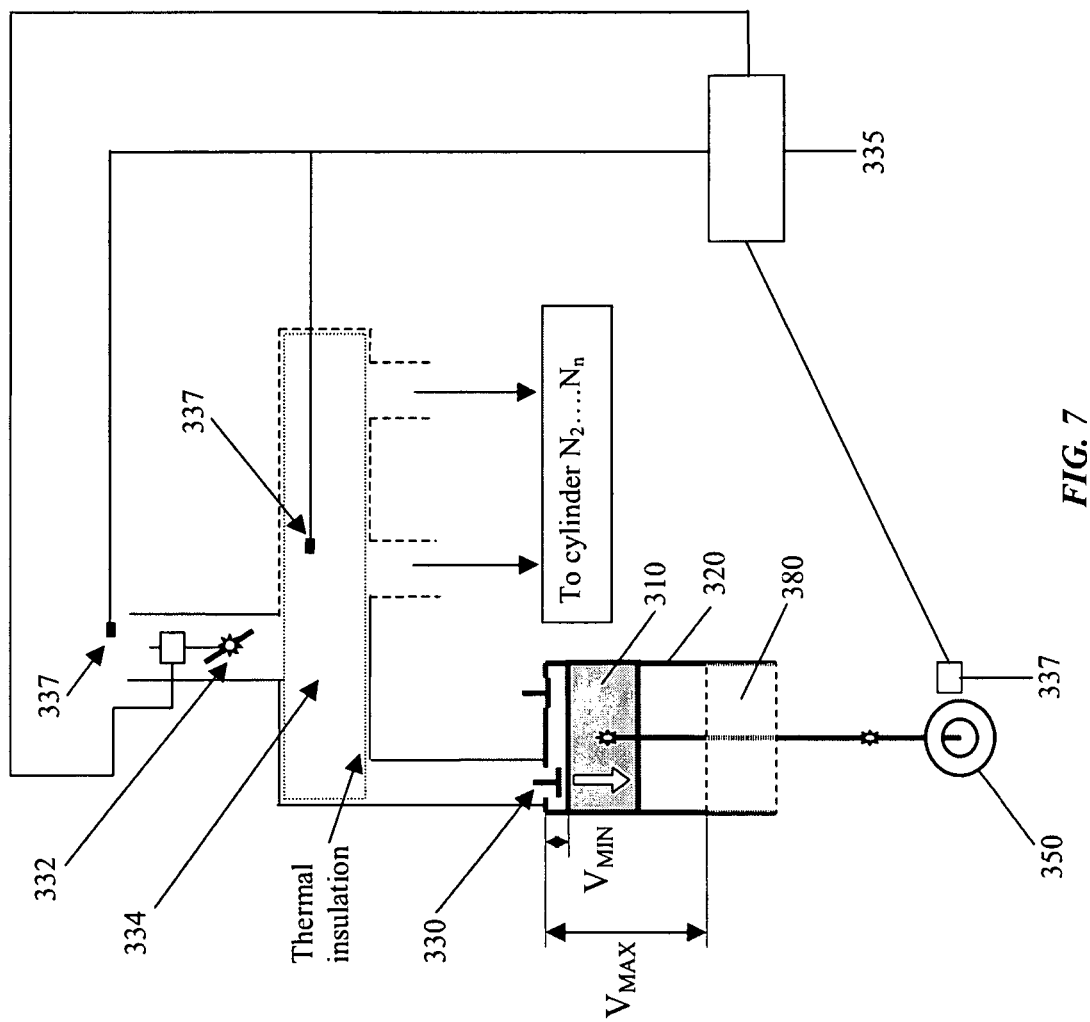
FIG. 7 is a block diagram of another embodiment of portions of an engine in accordance with the present invention.

In another example, a controlled damper may be utilized instead of an additional valve as shown in FIG. 7. A regulated damper 332 is installed at the input of an intake collector or receiver 334, which is common for all cylinders of an engine (not shown) of which a cylinder 320 is a part. A position of the damper position determines an amount of mixture entering the cylinders by creating a resistance to a mixture flow and thus controlling the average pressure $P_x$ and temperature $T_x$ inside of the receiver. An intake valve 330 may be kept open for an entire intake stroke (e.g., including a reserve stroke as described above) as in a conventional engine and thus may be controlled by the same simple mechanical methods with fixed timing as may be done in a conventional engine. For example, the receiver may be in fluid communication with the interiors of multiple cylinders via multiple such intake valves (e.g., intake valve 330). An interior of the receiver may include thermal insulation to regulate a temperature and flow rate of the fuel-air mixture from the damper toward the intake valve(s).

Due to reversibility of the substantially adiabatic process described above, the engine operation is independent of a specific timing at which the mixture fills the cylinder, as long as a molar amount (e.g., a mass) of a taken mixture received in an interior 380 of cylinder 320 is the same. As described above relative to FIG. 5, the maintenance of such a molar amount is satisfied by setting $V_C$ according to the expression (14) for a given fuel coefficient $C_F$ determined by (15). In case of regulated damper 332, a same required amount of the fuel mixture may be provided by adjusting the damper position so that $P_x$ and $T_x$ satisfy the following relation:

$$\frac{P_x V_{MAX}}{T_x} = C_F V_{MIN} \qquad (17)$$

This equation (17) above assumes that the air resistance of the intake valve is negligible, so that the pressure and temperature at point 3 in FIG. 3 are approximately equal to $P_x$ and $T_x$ measured by a sensor (e.g., one of sensors 337) inside the receiver. In a real situation, the amount of mixture will depend on the engine RPM (i.e., speed of the crankshaft, pistons, etc. in revolutions per minute) because of the increase of the intake valve resistance with increased RPM's. To account for this effect the equation (17) must be rewritten as follows:

$$\frac{P_x V_{MAX}}{T_x} = K_{rpm} C_F V_{MIN} \qquad (18)$$

where $K_{rpm}$ is a correction coefficient which is experimentally measured as a function of RPM for each particular engine design.

A controller 335 (e.g, a computing unit) may maintain an optimal filling of cylinders by controlling a position of damper 332 so that the measured values of $P_x$ and $T_x$ satisfy the relation (18). Controller 335 may also receive data about an angular speed w of a crankshaft 350, a temperature of the air-fuel mixture $T_1$, and/or a crankshaft position which determines a current cylinder volume $V_C$ via one or more sensors 337 configured to determine such parameters. Also, a pressure sensor may determine an interior pressure of interior 280 which may be provided to controller 335.

The damper may utilize a more sophisticated computing algorithm relative to the additional valve (i.e., valve 231) described above, and the use of the damper significantly simplifies the mechanical design relative to the additional valve. A damper is particularly advantageous for a multi-cylinder engine, because only one damper may be used for the whole engine. This possibility results from the fact that the sequential operation of cylinders in a multi-cylinder engine causes a steady non-pulsating reduction of the pressure in a receiver (e.g., receiver 334) below the atmospheric level. The pressure and temperature measurements are then averaged by the receiver and may be used to control a position of the damper, which is common for all cylinders.

Returning to FIGS. 2-3 and the cycle depicted in FIGS. 4A-F, a pressure in an interior of a cylinder (e.g., cylinder 120) during a power stroke may drop below an atmospheric level, crossing it at the point 7 of an expansion trace 5-6-7-8, where $V=V_E$. This point corresponds to the maximum expansion ratio $r_E$, at which the burned mixture still performs positive work, so that $r_E$ is used in the formula (8) to calculate efficiency, even in the case of $V_{MAX} > V_E$. As previously discussed, it may be advantageous to utilize an engine having cylinders and pistons configured with $V_{MAX} > V_E$ to enable using fuels with a wide range of octane ratings. For this purpose, the engine must be designed so that $V_E = V_{MAX}$ for the highest octane rating to be utilized with the engine. For lower octane ratings, $V_E$ is thus reduced to $V_E < V_{MAX}$ and the pressure drops below atmospheric when $V > V_E$.

To prevent atmospheric air from entering the cylinder in this case, the exhaust valve (e.g., valve 140 in FIGS. 4A-F) must open when volume reaches $V_E$ on the trace 8-7 (FIG. 3). Alternatively, such opening may be carried out by an additional low-pressure exhaust valve (not shown), which would open when the pressure reaches the atmospheric level at point 7 of trace 8-7.

In many prior art designs it would be reasonable to maintain $V_{MAX} \leq V_E$ to avoid a decrease of a cycle power due to increases in RPM of a corresponding engine cycle. However, in the engine disclosed herein, it is possible to maintain the cycle power at constant level for different engine RPMs, because such an increase of an intake manifold's resistance due to increased RPMs may be compensated for by adjusting an opening time of valve 130 depicted in FIG. 4. More particularly, the adjusting of such an opening and closing of the intake valve maintains a same amount of fuel mixture at different RPMs, consequently resulting in a constant cycle power. Preferably, a required volume $V_C$ of a fuel mixture may be provided by controlling a closing time of the intake valve (e.g., valve 130 depicted in FIG. 4). However, the same result may be achieved by adjusting a resistance of an intake manifold of the engine, for example with a damper (e.g., damper 332 depicted in FIG. 7), so that an amount of mixture provided to an interior (e.g., interior 180) of a cylinder of an engine is substantially an amount desired to maintain a desired cycle power at any RPM. For example, damper 332 may be controlled by controller 335 to adjust an amount of a fuel-air mixture flowing into cylinder 320 based on an octane rating of fuel which is utilized.

Further the requirements for the design of intake manifold and air filters may be significantly simplified for the described engine. Air filters may be made from denser materials and their lifetime can be significantly extended because the amount of the mixture may be automatically maintained (e.g., by a controller) by adjusting a damper position (e.g., of damper 332) or a timing of an additional intake valve (e.g., intake valve 231 depicted in FIG. 5) in accordance with pressure variations in the intake manifold. Further, the requirements for exhaust valves may be also simplified because the exhaust occurs at a much lower pressure which is close to, or at about, an atmospheric level.

Although, the main anticipated application of the engine described herein is the automotive industry, it is not intended to limit use in such a manner described. All gasoline engines may utilize the advantages of the proposed principle, which will, on average, save about 25% of fuel for a same cycle power. A resulting drop in the cycle power can be compensated by increased engine RPM, taking advantage of the described engine's ability to maintain constant amount of fuel mixture in a wide range of engine RPMs (i.e., via opening and closing valve 130, valve 231, and damper 332).

In one example, the engine described above may be used in electric power generators including engines in hybrid cars. In such a case, the described engine may be used for supplying electric power for the car drive train or charging batteries of the car when the car isn't moving. The described engine in this application may be optimized for a fixed RPM yielding the maximum possible efficiency, which will additionally simplify the overall design. Another example is in stationary power generators, where the consideration of engine size is secondary to the requirement of having the best possible efficiency.

As described above, operation of the engine described herein would result in exhaust gas at about atmospheric pressure and having a high temperature of about 1300 K. In conventional engines, the exhaust gas has a much higher temperature of about 1500-1800 K and pressure of about 4-6 atm, which requires use of comprehensive exhaust manifolds and dampers of acoustic vibrations. The relatively low exhaust pressure (e.g., close to atmospheric level) makes it possible to significantly simplify the exhaust manifold construction and avoid or minimize use of acoustic dampers. Further the exhaust heat may be recaptured via use of a heat exchanger, which may be utilized, for example, for rapid heating of a car interior during the winter. In another example, the exhaust heat may be converted into electricity, for example by a steam power generator which can provide additional power for charging a car battery.

Figure 9:
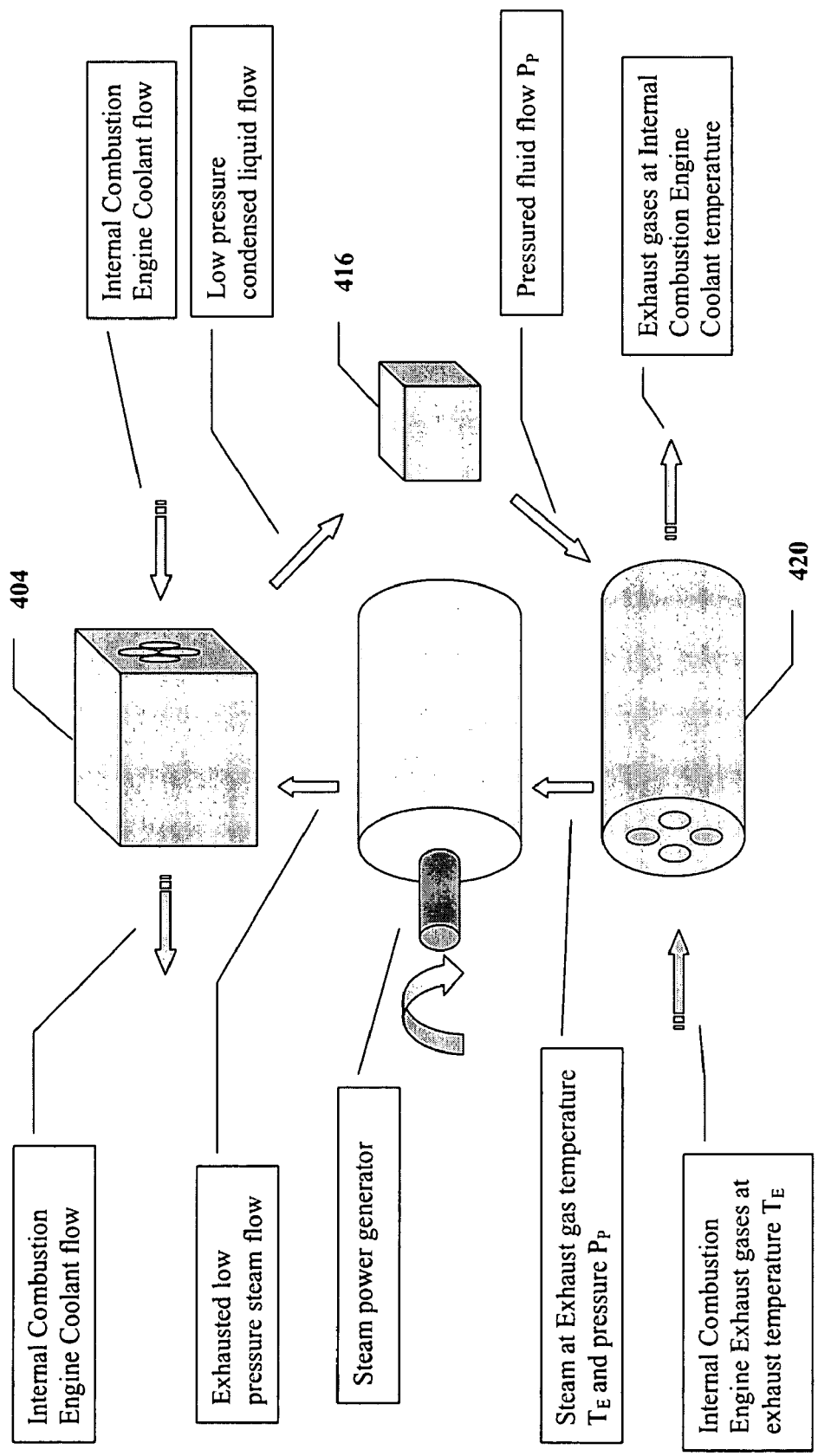
FIG. 9 is a block diagram depicting a thermal energy recovery system used with an engine in accordance with the present invention.

Further, in another example, a system for recapturing heat from the exhaust and from the engine coolant utilized in the example described above is depicted in FIG. 9. Internal combustion engine coolant flows through a steam condenser 400. A fluid pressure pump 410 pumps fluid from the steam condenser to a heat exchanger or fluid steamer which receives heat from the exhaust gases of an engine in accordance with one of the examples described above. Steam flows from the heat exchanger or fluid steamer to a steam powered generator which generates mechanical or electrical power. Low pressure steam then flows to the steam condenser which also acts as a heat exchanger with the internal combustion engine coolant flow.

Further, a proper utilization of the thermal energy of the steam cooled down from 1300K to 400K may save almost half of energy normally lost by an engine via the exhaust gas. This would result in the increase of the overall efficiency of the described engine to about 80-85%, which is noticeably higher than that of a conventional engine, which typically doesn't exceed 50%. Such a steam power generator may be of a closed-cycle type and may use liquids with smaller heat of evaporation, similar to liquids used in air conditioning systems.

Further, it is important to note that the described engine consumes almost half as much fuel per one cycle relative to a standard engine while the described engine causes a decrease of the cycle power by only 15-20%. This fact, together with a direct proportionality between the total engine power and its RPM, makes it possible to create engines, which will consume half as much fuel at a same cylinder volume. The power output per unit volume of the cylinder, and also the power per unit mass of the engine described herein, will outperform prior art engines, even without utilizing the steam generator described above.

Further, as will be understood from the above the described engine allows a more efficient conversion of the internal thermal energy of expanding burned fuel mixture into mechanical energy. As described, gas compression and expansion in the engine occurs according to an approximately reversible adiabatic processes. Moreover, this approximate reversibility is used to allow the manipulating the rate of intake of the fuel mixture, thereby making it possible to significantly increase the expansion ratio (e.g., $V_{MAX}/V_{MIN}$) without a corresponding increase of the final pre-ignition compression pressure in the cylinder (e.g., as compared to a conventional engine), thus avoiding undesirable detonation.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method for use in generating power in an internal combustion engine from combustion of a fuel admixed with an oxidizing medium and operating cyclically with intentional ignition of a fuel or with self-ignition of a fuel, the method comprising:
periodically changing a volume of a variable-volume combustion chamber from a minimum volume to a maximum volume;
controlling a flow of a fuel and an oxidizing medium into the chamber by an intake mechanism in such a way as to provide an upper limit on an amount of the fuel and the oxidizing medium which fills the chamber in each chamber-filling intake part of an engine cycle, the upper limit corresponding to a critical volume of the chamber at which the flow of the fuel and the oxidizing medium is cut off by the intake mechanism, the critical volume being smaller than the maximum volume;
wherein a ratio of the maximum volume to the minimum volume is greater than a ratio of the critical volume to the minimum volume and is greater than a ratio of the maximum volume to the minimum volume causing self-ignition of the fuel;
wherein the critical volume is a volume such as to just avoid self ignition at a subsequent compression of the fuel admixed with the oxidizing medium to the minimum volume in a subsequent compression stroke part of the cycle when the fuel is a fuel intended for utilization with intentional ignition, and wherein the critical volume is a volume to just achieve self ignition at the subsequent compression of the fuel admixed with the oxidizing medium to the minimum volume in the subsequent compression stroke part of the cycle when the fuel is a fuel intended for utilization with self-ignition; and
wherein the intake mechanism comprises a low pressure intake valve controlled by a controller and immediately upstream of a high pressure intake valve of the combustion chamber, the high pressure intake valve allowing fluid communication between the chamber and an exterior of the chamber, and the controller controlling the low pressure intake valve to control the flow of the fuel and the oxidizing medium to the high pressure intake valve to provide resistance to the flow of the fuel and the oxidizing medium to the high pressure intake valve.

2. A method for use in generating power in an internal combustion engine from combustion of a fuel admixed with an oxidizing medium and operating cyclically with intentional ignition of a fuel or with self-ignition of a fuel, the method comprising:
periodically changing a volume of a variable-volume combustion chamber from a minimum volume to a maximum volume;
controlling a flow of a fuel and an oxidizing medium into the chamber by an intake mechanism in such a way as to provide an upper limit on an amount of the fuel and the oxidizing medium which fills the chamber in each chamber-filling intake part of an engine cycle, the upper limit corresponding to a critical volume of the chamber at which the flow of the fuel and the oxidizing medium is cut off by the intake mechanism, the critical volume being smaller than the maximum volume;
wherein a ratio of the maximum volume to the minimum volume is greater than a ratio of the critical volume to the minimum volume and is greater than a ratio of the maximum volume to the minimum volume causing self-ignition of the fuel;
wherein the critical volume is a volume such as to just avoid self ignition at a subsequent compression of the fuel admixed with the oxidizing medium to the minimum volume in a subsequent compression stroke part of the cycle when the fuel is a fuel intended for utilization with intentional ignition, and wherein the critical volume is a volume to just achieve self ignition at the subsequent compression of the fuel admixed with the oxidizing medium to the minimum volume in the subsequent compression stroke part of the cycle when the fuel is a fuel intended for utilization with self-ignition; and
wherein the combustion chamber is a first combustion chamber of a plurality of combustion chambers, the intake mechanism comprising a low pressure intake valve controlled by a controller and upstream of a plurality of high pressure intake valves of the plurality of combustion chambers, the plurality of high pressure intake valves allowing fluid communication between the plurality of combustion chambers and an exterior of the plurality of combustion chambers, and the controller controlling the low pressure intake valve to control the flow of the fuel and the oxidizing medium to the plurality of high pressure intake valves to provide resistance to the flow of the fuel and the oxidizing medium to the plurality of high pressure intake valves to provide the upper limit corresponding to the critical volume.

3. A method for use in generating power in an internal combustion engine from combustion of a fuel admixed with an oxidizing gas and operating cyclically with intentional ignition of a first fuel or with self-ignition of a second fuel, the method comprising:

periodically changing a volume of a variable-volume combustion chamber from a fixed minimum volume to a fixed maximum volume, the maximum volume greater than a critical volume;

the critical volume comprising a volume of the chamber filled with an oxidizing gas at an initial temperature and an initial pressure such that when the chamber is compressed from the critical volume to the minimum volume the gas reaches a maximum temperature and a maximum pressure causing detonation of the first fuel or the gas exceeds a maximum temperature and a maximum pressure predetermined for self ignition of the second fuel;

controlling a flow of the oxidizing gas into the chamber in such a way as to provide an upper limit on an amount of the oxidizing gas which fills the chamber in each chamber-filling intake part of an engine cycle, the upper limit comprising a mass less than an amount of a mass of the oxidizing gas in the critical volume of the chamber, wherein a ratio of the maximum volume to the minimum volume is greater than 16.

4. The method of claim 3 wherein the fuel comprises a fuel ignitable by a spark plug.

5. The method of claim 3 wherein the fuel comprises a self-ignitable fuel.

6. The method of claim 3 wherein the controlling the flow of the gas comprises a combustion chamber intake valve closing at a volume less than the critical volume during each chamber-filling intake part of the engine cycle.

7. The method of claim 6 further comprising an intake mechanism having the combustion chamber intake valve controlled by a controller.

8. The method of claim 7 wherein the controlling the flow of the fuel and the oxidizing gas comprises the controller controlling the flow of the fuel and the oxidizing gas based on an initial temperature and an initial pressure of the fuel and the oxidizing gas.

9. The method of claim 7 wherein the controlling the flow comprises the controller controlling the flow of the fuel and the oxidizing gas based on an angular speed of a crankshaft of the engine.

10. The method of claim 7 wherein the controlling the flow comprises the controller controlling the flow of the fuel and the oxidizing gas based on a determining of an instantaneous volume of the combustion chamber during an intake stroke.

11. The method of claim 7 wherein the controlling the flow comprises the controller controlling the flow of the fuel and the oxidizing gas based on a type of the fuel.

12. The method of claim 7 wherein the controlling the flow comprises the controller controlling the flow of the fuel and the oxidizing gas based on a speed of a change in a volume of the combustion chamber.

13. The method of claim 7 wherein the controlling the flow comprises the controller controlling the flow of the fuel and the oxidizing gas based on a resistance to a flow of the fuel and the oxidizing gas through an intake manifold toward the chamber.

14. The method of claim 7 further comprising coupling a heat exchanger to an exhaust manifold receiving exhaust, the heat exchanger coupled to a closed cycle steam generator configured to generate additional power utilizing a difference in temperature of exhausted gases relative to an engine coolant.

15. The method of claim 7 further comprising a low pressure intake valve controlled by the controller and immediately upstream of a combustion chamber intake valve of the combustion chamber, the combustion chamber intake valve allowing fluid communication between the chamber and an exterior of the chamber, and the controller controlling the low pressure intake valve to control the flow of the fuel and the oxidizing gas to the combustion chamber intake valve to provide resistance to the flow of the fuel and the oxidizing gas to the combustion chamber intake valve.

16. The method of claim 7 wherein the combustion chamber is a first combustion chamber of a plurality of combustion chambers, and further comprising a low pressure intake valve controlled by a controller and upstream of a plurality of combustion chamber intake valves of the plurality of combustion chambers, the plurality of combustion chamber intake valves allowing fluid communication between the plurality of combustion chambers and an exterior of the plurality of combustion chambers, and the controller controlling the low pressure intake valve to control the flow of the fuel and the oxidizing medium to the plurality of combustion chamber intake valves to provide resistance to the flow of the fuel and the oxidizing gas to the plurality of combustion chamber intake valves to provide the upper limit corresponding to the critical volume.

17. The method of claim 7 wherein the maximum volume is greater than or equal to an effective expansion volume, the effective expansion volume comprising a volume when a pressure of an exhaust gas and a burned fuel in the chamber is equal to a pressure of a surrounding ambient environment.

18. The method of claim 17 further comprises controlling the exhausting of the exhaust gas out of the combustion chamber by the controller via exhaust mechanisms at the effective expansion volume.

* * * * *